US007093993B2

(12) United States Patent
Skoog et al.

(10) Patent No.: US 7,093,993 B2
(45) Date of Patent: Aug. 22, 2006

(54) APPARATUS AND METHODS FOR CLEANING AND PRIMING OF COATED SURFACES

(75) Inventors: Andrew Jay Skoog, West Chester, OH (US); Jane Ann Murphy, Franklin, OH (US)

(73) Assignee: General Electric Company, Schenectady, NY (US)

( * ) Notice: Subject to any disclaimer, the term of this patent is extended or adjusted under 35 U.S.C. 154(b) by 275 days.

(21) Appl. No.: 10/721,967

(22) Filed: Nov. 21, 2003

(65) Prior Publication Data

US 2005/0111903 A1 May 26, 2005

(51) Int. Cl.
*B43M 11/06* (2006.01)
*A47L 1/08* (2006.01)
*B32B 32/00* (2006.01)

(52) U.S. Cl. ...................... 401/185; 401/137; 427/140; 427/142

(58) Field of Classification Search ........ 401/183–186, 401/123, 137; 427/140, 142; 604/1–3
See application file for complete search history.

(56) References Cited

U.S. PATENT DOCUMENTS

| | | | | |
|---|---|---|---|---|
| 2,311,367 | A | 2/1943 | Chambers | |
| 3,195,544 | A | 7/1965 | Politzer | |
| 3,369,854 | A | 2/1968 | Ferris | |
| 3,876,314 | A * | 4/1975 | Nehring | 401/133 |
| 4,278,360 | A | 7/1981 | Lorscheid et al. | |
| 4,690,579 | A | 9/1987 | Tuckman | |
| 4,710,048 | A | 12/1987 | Vartoughian | |
| 4,875,602 | A | 10/1989 | Chickering et al. | |
| 4,875,791 | A | 10/1989 | Hassan | |
| D310,601 | S | 9/1990 | Byriel | |
| 5,307,847 | A | 5/1994 | Pavenick et al. | |
| 5,454,659 | A | 10/1995 | Voxbikian et al. | |
| 5,872,090 | A | 2/1999 | You et al. | |
| 5,890,829 | A | 4/1999 | Hesse | |
| 5,934,296 | A | 8/1999 | Clay | |
| 6,233,771 | B1 | 5/2001 | Hortel et al. | |
| 6,250,833 | B1 | 6/2001 | Perry et al. | |
| 6,413,578 | B1 * | 7/2002 | Stowell et al. | 427/142 |

* cited by examiner

*Primary Examiner*—David J. Walczak
(74) *Attorney, Agent, or Firm*—McNees Wallace & Nurick LLC

(57) ABSTRACT

Apparatus and methods for cleaning and repairing a thermal barrier coating on a component designed for use in a hostile thermal environment, such as turbine, combustor and augmentor components of a gas turbine engine. The apparatus is a handheld tool that includes an applicator and a fluid dispensing unit. The method involves use of the apparatus to clean and repair a damaged coating such as a thermal barrier coating on a coated article. After cleaning the surface area of the component exposed by the localized spallation using a first apparatus, a second apparatus is used to apply and distribute a liquid mixture such as a primer or a coating repair composition the damaged area of the coating. The cleaning and repair methods can be performed while the component remains installed, e.g., in a gas turbine engine.

20 Claims, 3 Drawing Sheets

APPARATUS AND METHODS FOR CLEANING AND PRIMING OF COATED SURFACES

FIELD OF THE INVENTION

This invention relates to apparatus and methods for cleaning and repairing of thermal barrier coatings for components exposed to high temperatures, such as the hostile thermal environment of a gas turbine engine. More particularly, this invention is directed to tools and methods for cleaning and priming of specially coated surfaces on gas-turbine powered aircraft, such as a thermal barrier coating that has suffered localized spallation due to thermal fatigue and stress, poor coating processes, coating defects, localized damage, impact damage and other mechanical damage.

BACKGROUND OF THE INVENTION

Higher operating temperatures for gas turbine engines are continuously sought in order to increase their efficiency. However, as operating temperatures increase, the high temperature durability of the components of the engine must correspondingly increase. Significant advances in high temperature capabilities have been achieved through the formulation of nickel and cobalt-base superalloys. Nonetheless, when used to form components of the turbine, combustor and augmentor sections of a gas turbine engine, such alloys alone are often susceptible to damage by oxidation and hot corrosion attack and may not retain adequate mechanical properties. For this reason, these components are often protected by an environmental and/or thermal-insulating coating, the latter of which is termed a thermal barrier coating (TBC) system. Ceramic materials, and particularly yttria-stabilized zirconia (YSZ), are widely used as a thermal barrier coating (TBC), or topcoat, of TBC systems used on gas turbine engine components. These particular materials are widely employed because they can be readily deposited by plasma spray, flame spray and vapor deposition techniques. A commonly used type of TBC is a coating based on zirconia stabilized with yttria, for example about 93 wt. % zirconia stabilized with about 7 wt. % yttria. This general type of TBC has been reported in such United States patents as U.S. Pat. No. 4,055,705, U.S. Pat. No. 4,328,285, and U.S. Pat. No. 5,236,745, which are incorporated herein by reference.

During routine operation of the engine and aircraft, the coated surfaces, particularly those in or near the flowpath (intake, compression, combustion and exhaust) of the gas turbine engine, are subjected to heat, pressure and other forces can cause the coating to suffer localized damage such as spallation due to thermal fatigue and stress, defects, impact damage and other mechanical damage. For these reasons, the coated surfaces must be routinely inspected and meticulously repaired to avoid further damage to the coated surfaces and the underlying substrate. Maintenance personnel must inspect all visible surfaces, often requiring the use of flashlights, mirrors, and other inspection tools to access remote areas such as the small cooling holes and exhaust ports in a gas turbine engine. In the case of aircraft turbine engines and large power generation turbines, removing the turbine from service for repairs results in significant costs in terms of labor and downtime. For these reasons, removing components having TBCs that have suffered only localized damage such as spallation is not economically desirable. As a result, components identified as having only localized coating damage are often analyzed to determine whether the damage has occurred in a high stress area, and a judgment is then made as to the risk of damage to the turbine due to the reduced thermal protection of the component that could lead to catastrophic failure of the component.

Once a localized damaged coating area is located by inspection, and the decision is made to effect a field repair in situ, maintenance personnel must clean and prime the damaged area. Optionally, the field personnel may also apply a repair coating composition to the damaged surface, such as the compositions described in commonly-owned U.S. Pat. No. 6,413,578, for example. Current tools for cleaning, priming and optionally applying a repair coating are inadequate. Known tools are often too large, too small, or otherwise insufficient to perform the cleaning, priming and repairs. For example, maintenance personnel often use spray bottles and other containers for dispensing cleaning solutions such as solvents and detergents, beakers containing primers and coating repair compositions, and multiple brushes for cleaning and applying cleaning solutions, primers and repair compositions. In addition to the cumbersome use of so many different items, this situation creates a safety hazard to the personnel as well as a mechanical hazard to subsequent operation of the engine. While maintenance protocols require an accounting of each item used in the engine area, the use of a large number of tools makes the accounting process difficult, and more prone to errors that can have catastrophic results.

For all these reasons, there exists a continuing need for maintenance tools that can be effectively and efficiently used in limited access areas of engine and flowpath areas to clean, prime, and optionally repair damaged coated surfaces. There is additionally a need for maintenance tools and cleaning methods that can be used to perform one or more of the tasks of cleaning, priming, and repairing of coated surfaces in situ.

Accordingly, it would be desirable if a cleaning, priming and repair method were available that could be performed on localized damaged areas of TBC on turbine hardware in field and in situ, without necessitating that the component be removed from the turbine, so that downtime and scrappage are minimized.

SUMMARY OF THE INVENTION

The present invention provides apparatus and methods for cleaning, priming and repairing of coated surfaces, such as thermal barrier coatings, on a coated component that has suffered localized coating damage due to spallation, fatigue, stress damage, mechanical damage, or wear of the thermal barrier coating. The apparatus and methods of the present invention allow on-wing, in-field, in situ cleaning, priming, and repair of defects and damage to coatings such as TBCs.

The present invention provides handheld apparatus for cleaning and application of cleaning, priming, and repair materials for in situ repair of a damaged coating. In one embodiment, the apparatus of the invention provides an applicator communicably connected by a dispensing tube to a liquid reservoir such as a squeeze bulb, so that liquid such as cleaning solvent may be dispensed through the applicator by squeezing the bulb. Preferably, the applicator is a brush having a plurality of bristles, and the liquid reservoir or dispensing tube has valve means to prevent unintended dispensing of liquid.

In another embodiment, the apparatus of the invention provides an applicator that is attached to, but not communicably connected with, a fluid dispensing unit. The fluid dispensing unit is comprised of a liquid reservoir, such as a squeeze bulb, communicably connected to one end of a dispensing tube, and a dispensing tip communicably connected to the opposite end of the dispensing tube. Liquid, such as cleaning solution, primers, and coating repair compositions may be dispensed through dispensing tube and out of the dispensing tip by squeezing the bulb. Preferably, the applicator is a brush having a plurality of bristles, and the liquid reservoir or dispensing tube has valve means to prevent unintended dispensing of liquid. Preferably, the dispensing tip is disposed so as to evenly dispense liquid in close proximity to the cleaning head. The dispensing tip has an internal channel that is generally converging in shape so as to restrict fluid flow to allow precise distribution of small amounts of fluid from the tip onto a surface such as a damaged surface coating on an article.

In yet another embodiment, apparatus of the invention provides an applicator that is attached to, but not communicably connected with, a fluid dispensing unit. The fluid dispensing unit is comprised of a liquid reservoir, such as a squeeze bulb, communicably connected to a plurality of dispensing tubes, each dispensing tube communicably connected to a dispensing tip. Preferably, each dispensing tip is disposed so as to evenly dispense liquid in close proximity to the cleaning head. Although each dispensing tip may have a different sized or shaped opening, each dispensing tip has an internal channel that is generally converging in shape so as to restrict fluid flow to allow precise distribution of small amounts of fluid from each tip onto a surface such as a damaged surface coating on an article. Optionally, one or more tips may have closing means such as a closable valve or cap to allow a user to distribute fluid from only selected ones of the tips.

Liquid, such as cleaning solutions, primers, and repair coating compositions may be dispensed through the dispensing tubes and out of the dispensing tips by squeezing the bulb. Preferably, the applicator is a brush having a plurality of bristles, and the fluid dispensing unit has valve means to prevent unintended dispensing of liquid. Preferably, at least one of the dispensing tips is disposed so as to dispense liquid in close proximity to the cleaning head.

The method of cleaning, priming, and optionally repairing a coated surface of the present invention involves cleaning of a damaged area of a coating with an apparatus having an applicator, dispensing a liquid from the apparatus, and applying the liquid using the applicator to distribute the liquid. Preferably, the liquid is a cleaning solution, a primer, or a repair composition. Additional steps may include providing a second apparatus having an applicator and a liquid dispensing unit comprised of a liquid reservoir containing a liquid such as a primer or repair coating composition, wherein the liquid reservoir is communicably connected to one end of a dispensing tube, and a dispensing tip is communicably connected to the opposite end of the dispensing tube, dispensing a liquid from the dispensing tip of the second apparatus by applying external pressure to the liquid reservoir; distributing the liquid using the applicator of the second apparatus.

In view of the above, it can be appreciated that the invention overcomes several disadvantages of prior methods used to clean, prime, and optionally repair damaged coatings in the flowpath of gas turbine engines. In particular, the method of this invention does not require the simultaneous or concurrent use of multiple handheld apparatus such as beakers, spray bottles, brushes to effect the application of cleaning fluids, primers, and repair coating compositions to a localized damaged coating area. Additionally, the design of the apparatus of the present invention allows controlled release of liquid regardless of the orientation of the apparatus or vertical disposition of the coated surface. Thus, the apparatus can be used in overhead surfaces and other ergonomically challenging positions. Additionally, the apparatus is designed for single-hand use, thus providing improved access to remote and limited access areas such as the exhaust outlets of a turbine engine, and further providing the operator with a free hand to perform other functions.

As a further advantage, the repair process involves a minimum of tools since the apparatus provides both an applicator and means for storing and dispensing a liquid.

Other objects and advantages of this invention will be better appreciated from the following detailed description. Other features and advantages of the present invention will be apparent from the following more detailed description of the preferred embodiments, taken in conjunction with the accompanying drawings which illustrate, by way of example, the principles of the invention.

BRIEF DESCRIPTION OF THE DRAWINGS

Whenever possible, the same reference numbers will be used throughout the drawings to refer to the same or like parts.

DETAILED DESCRIPTION OF THE INVENTION

The present invention is directed to an apparatus and method for cleaning, priming and repairing of coated surfaces, such as thermal barrier coatings, on a coated component that has suffered localized coating damage due to spallation, fatigue, stress damage, mechanical damage, or wear of the thermal barrier coating. The apparatus and method of the present invention allow on-wing, in-field, in situ cleaning, priming, and repair defects and damage to coatings such as TBCs.

Figure 1:
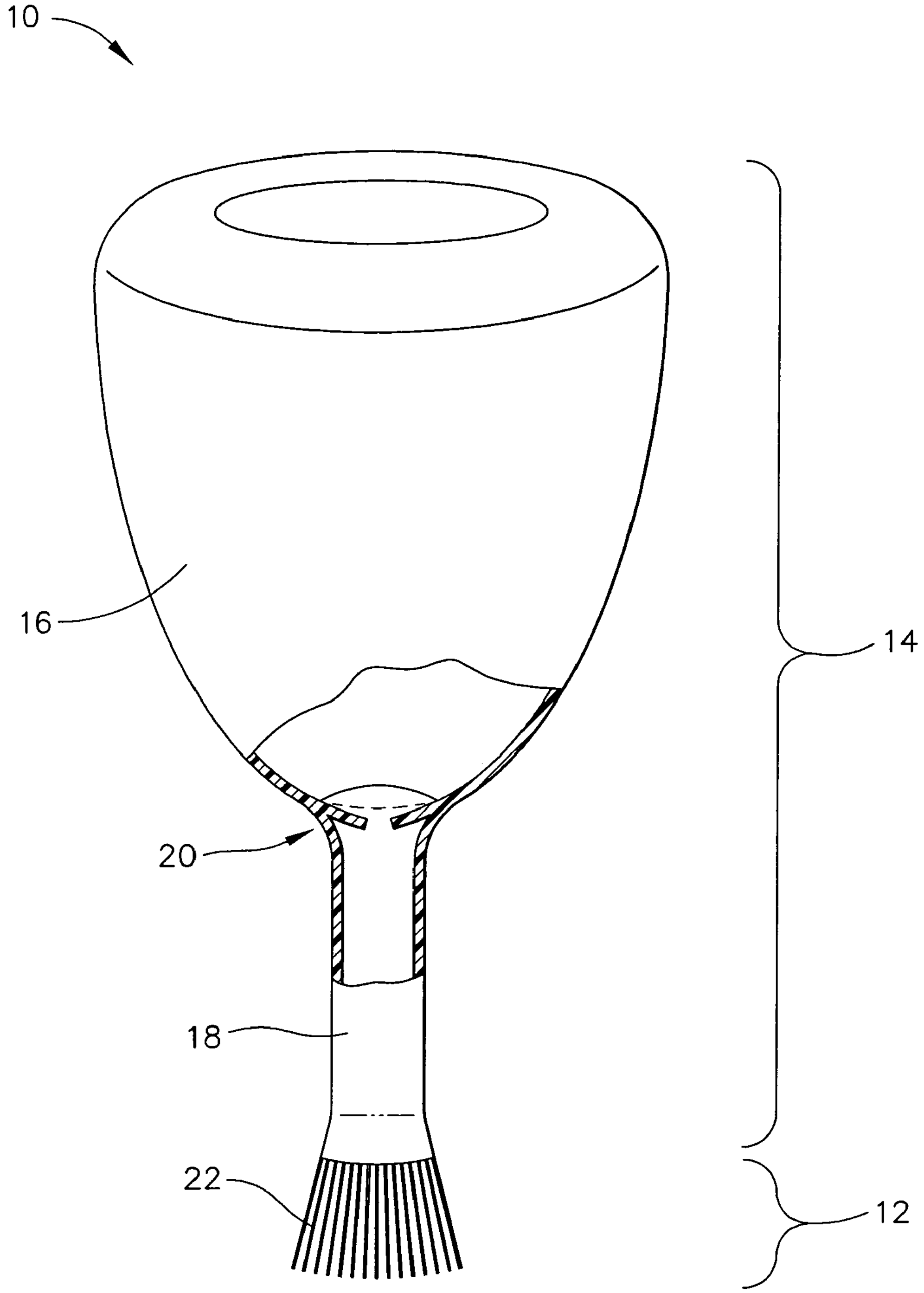
FIG. 1 is a partial cross-section front view of a first embodiment of the apparatus of the present invention.

In a first embodiment shown in FIG. 1, the present invention is a handheld apparatus 10 for cleaning and application of cleaning, priming, and/or repair materials for in situ repair of a damaged coating. In this embodiment, the apparatus 10 of the invention provides an applicator 12 communicably connected to a fluid dispensing unit 14, the fluid dispensing unit having a liquid reservoir 16, here shown as a squeeze bulb, communicably connected to a dispensing tube 18. As used herein, "applicator" means any abrasive non-abrasive applicator, such as, but not limited to a bristled brush, sponge, or other porous material, whether made of cloth, metal, plastic or composites, that is fabricated for cleaning, for application and smoothing of liquids, or for any combination of these purposes. Liquids such as cleaning solutions, primers and coating repair compositions may be dispensed from the liquid reservoir 16 through the dispensing tube 18 to the applicator 12 by applying external pressure, such as by squeezing, the liquid reservoir 16. Preferably, the applicator 12 is a brush having a plurality of bristles 22. More preferably, the liquid reservoir 16 includes valve means 20 to prevent unintended dispensing of liquid. Alternatively, the valve means 20 may be provided in the dispensing tube 18. Any known valve means 20, such as seated ball valves, flapper valves, spring controlled valves, or the like may be provided to control dispensing of liquid from the reservoir 16.

Figure 2:
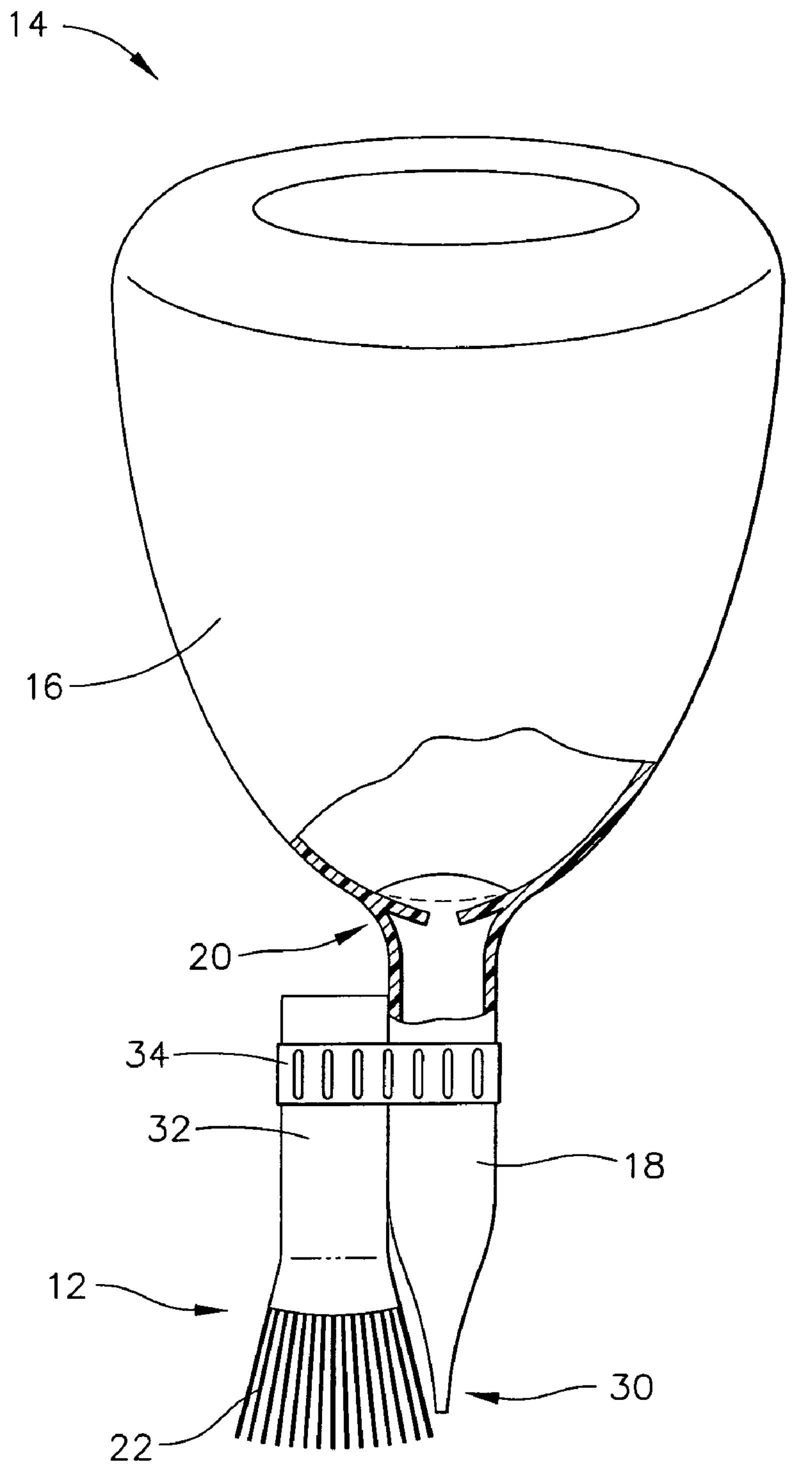
FIG. 2 is a partial cross-section front view of a second embodiment of the apparatus of the present invention.

In a second embodiment shown in FIG. 2, the apparatus of the invention provides an applicator 12 connected to a fluid dispensing unit 14, the fluid dispensing unit comprised of a liquid reservoir 16, here shown as a squeeze bulb, communicably connected to a dispensing tube 18 having a dispensing tip 30. In this embodiment, the dispensing tube 18 is not communicably connected to the applicator 12. The applicator may be mounted on the dispensing tube or on a parallel shaft 32 connected to the dispensing tube 18 by a connector 34, here shown as a metallic clamp. Preferably, the dispensing tube 18 and dispensing tip 30 are disposed so as to dispense liquid in close proximity to the cleaning head. In another embodiment, a plurality of dispensing tubes 18 and dispensing tips 30 are provided to ensure adequate liquid supply to a desired damaged coating area. Preferably, at least one of the dispensing tips 30 is disposed to as to dispense liquid in close proximity to the applicator 12.

Figure 3:
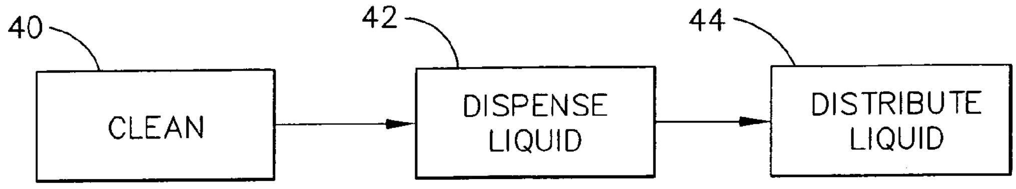
FIG. 3 is a diagram of the steps of the method of the preset invention in a first embodiment.
Figure 4:
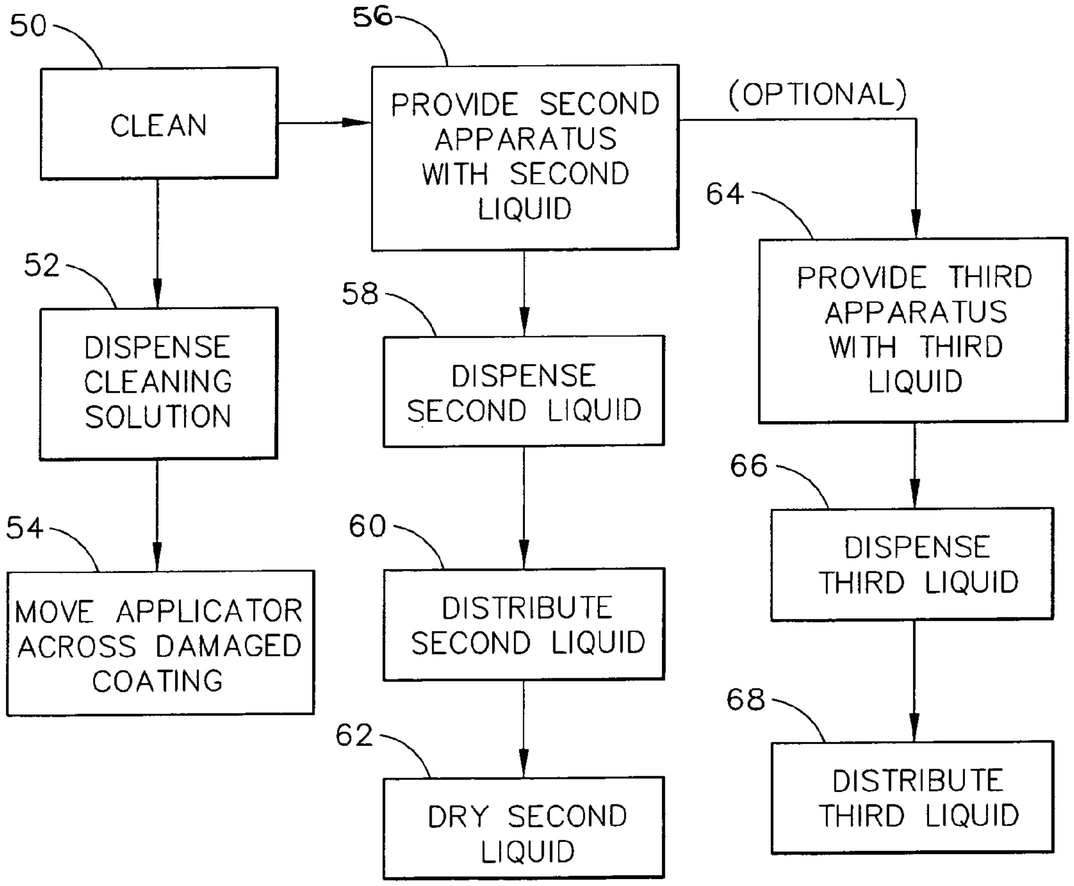
FIG. 4 is a diagram of the steps of the method of the present invention in a second embodiment.

FIGS. 3–4 illustrate preferred methods of cleaning, priming, and optionally repairing a coated surface of the present invention. As shown in FIG. 3, the method involves the step 40 of cleaning of a damaged area of a coating with an apparatus having an applicator by moving the applicator 12 across the damaged area, followed by the step 42 of dispensing a liquid from the apparatus by applying external pressure, followed by the step 44 of distributing the liquid using the applicator 12. Preferably, the liquid is a cleaning solution, a primer, or a repair composition. According to the invention, each step of the repair method can be performed while the component remains installed, e.g., in a gas turbine engine.

As shown in FIG. 4, the methods are particularly applicable to effecting cleaning, priming and repair of TBC coatings in the flowpath of a gas turbine engine. In this embodiment, the repair process begins with step of 50 cleaning of the damaged area using the first cleaning apparatus of FIG. 1 having an applicator 12 and fluid dispensing unit, the step further comprising the substep of 52 dispensing cleaning solution from the fluid dispensing unit to the applicator 12, followed by the substep 54 of moving the applicator 12 across the damaged coating to remove contaminants and any residual fragments of the coating. The next step 56 involves providing a second fluid dispensing apparatus such as that of FIG. 2, the second apparatus having an applicator 12 and a dispensing tube 18, the dispensing tube 18 communicably connected to the liquid reservoir on one end and to a dispensing tip 30 on the opposite end of the dispensing tube 18, the liquid reservoir 16 containing a liquid primer composition therein, followed by the step 58 of dispensing liquid primer onto the damaged coating area, followed by the step 60 of distributing the liquid primer using the applicator 12 of the second apparatus. Optionally, the method further comprises the step 62 of allowing the primer to dry, followed by the step 64 of applying a repair composition using a third apparatus such as that of FIG. 2 , the third apparatus having an applicator 12 and a dispensing tube 18, the dispensing tube 18 communicably connected to a liquid reservoir 16 on one end and to a dispensing tip 30 on the opposite end of the dispensing tube 18, the liquid reservoir 16 containing a coating repair composition therein. The step 64 may be comprised of the substep 66 of dispensing the repair composition onto the damaged area, followed by the substep 68 of distributing the repair composition using the third apparatus. The repair composition is preferably is a liquid mixture comprising one or more refractory materials such as ceramic, glass, oxides of alumina, zirconia, hafnia, magnesia, titanium, calcium, silica, yttria, and combinations thereof, the refractory material provided in powdered form, one or more binders, and a solvent. According to the invention, each step of the repair method can be performed while the component remains installed, e.g., in a gas turbine engine.

While the advantages of this invention are particularly applicable to components of gas turbine engines and to coated parts in or near the flowpath of such engines, the invention is generally applicable to any coated component that requires cleaning, priming, or repair of local coating damage.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of cleaning a coated surface of an article, the method comprised of the steps of providing a coated article, the article comprised of a component of a gas turbine engine assembly installed in the flowpath of a gas turbine engine, the article having a damaged coating area;

providing an apparatus having an applicator communicably connected to a liquid dispensing unit by a dispensing tube, the liquid dispensing unit comprised of a liquid reservoir containing a cleaning solution, the liquid reservoir communicably connected to the applicator by a dispensing tube;

cleaning the damaged area of the coating with the apparatus by moving the applicator across the damaged area;

dispensing a liquid from the apparatus by applying external pressure to the liquid reservoir;

distributing the liquid using the applicator;

providing a second apparatus comprised of a liquid dispensing unit comprised of a liquid reservoir containing a liquid, the liquid reservoir communicably connected to one end of a dispensing tube, and a dispensing tip communicably connected to the opposite end of the dispensing tube, the apparatus further comprised of at least one applicator attached to, but not communicably connected with, the fluid dispensing unit; and dispensing a liquid from the dispensing tip of the second apparatus by applying external pressure to the liquid reservoir; and distributing the liquid using the applicator of the second apparatus.

2. The method of claim 1, wherein the liquid contained in the liquid reservoir of the second apparatus is selected from the group consisting of primers and coating repair compositions.

3. The method of claim 2, wherein the coating repair composition is a liquid mixture comprising one or more refractory materials in powdered form, one or more binders, and a solvent.

4. The method of claim 3, wherein the refractory materials are selected from the group consisting of oxides of alumina, zirconia, hafnia, magnesia, titanium, calcium, silica, yttria, and combinations thereof.

5. The method of claim 1, further comprised of the steps of providing a third apparatus comprised of a liquid dispensing unit comprised of a liquid reservoir containing a liquid, the liquid reservoir communicably connected to one end of a dispensing tube, and a dispensing tip communicably connected to the opposite end of the dispensing tube, the apparatus further comprised of at least one applicator attached to, but not communicably connected with, the fluid dispensing unit; and dispensing a liquid from the dispensing tip of the third apparatus by applying external pressure to the liquid reservoir; and distributing the liquid using the applicator of the third apparatus.

6. The method of claim 5, wherein the liquid contained in the liquid reservoir of the second apparatus is a primer, and wherein the liquid contained in the reservoir of the third apparatus is a coating repair composition comprised of a liquid mixture comprising one or more refractory materials, one or more binders, and a solvent.

7. The method of claim 6, wherein the refractory materials are selected from the group consisting of oxides of alumina, zirconia, hafnia, magnesia, titanium, calcium, silica, yttria, and combinations.

8. A method of cleaning a coated surface of an article, the method comprised of the steps of providing a coated article, the article comprised of a component of a gas turbine engine assembly installed in the flowpath of a gas turbine engine, the article having a thermal barrier coating, the coating having a damaged coating area;

providing an apparatus having an applicator communicably connected to a liquid dispensing unit by a dispensing tube, the liquid dispensing unit comprised of a liquid reservoir containing a cleaning solution, the liquid reservoir communicably connected to the applicator by a dispensing tube;

cleaning the damaged area of the coating with the apparatus by moving the applicator across the damaged area;

dispensing a liquid from the apparatus by applying external pressure to the liquid reservoir;

distributing the liquid using the applicator;

providing a second apparatus comprised of a liquid dispensing unit comprised of a liquid reservoir containing a liquid, the liquid reservoir communicably connected to one end of a dispensing tube, and a dispensing tip communicably connected to the opposite end of the dispensing tube, the apparatus further comprised of at least one applicator attached to, but not communicably connected with, the fluid dispensing unit; and dispensing a liquid from the dispensing tip of the second apparatus by applying external pressure to the liquid reservoir; and distributing the liquid using the applicator of the second apparatus.

9. The method of claim 8, wherein the liquid contained in the liquid reservoir of the second apparatus is selected from the group consisting of primers and coating repair compositions.

10. The method of claim 9, wherein the coating repair composition is a liquid mixture comprising one or more refractory materials in powdered form, one or more binders, and a solvent.

11. The method of claim 10, wherein the refractory materials are selected from the group consisting of oxides of alumina, zirconia, hafnia, magnesia, titanium, calcium, silica, yttria, and combinations thereof.

12. The method of claim 11, further comprised of the steps of providing a third apparatus comprised of a liquid dispensing unit comprised of a liquid reservoir containing a liquid, the liquid reservoir communicably connected to one end of a dispensing tube, and a dispensing tip communicably connected to the opposite end of the dispensing tube, the apparatus further comprised of at least one applicator attached to, but not communicably connected with, the fluid dispensing unit; and dispensing a liquid from the dispensing tip of the third apparatus by applying external pressure to the liquid reservoir; and distributing the liquid using the applicator of the third apparatus.

13. The method of claim 12, wherein the liquid contained in the liquid reservoir of the second apparatus is a primer, and wherein the liquid contained in the reservoir of the third apparatus is a coating repair composition comprised of a liquid mixture comprising one or more refractory materials, one or more binders, and a solvent.

14. The method of claim 13, wherein the refractory materials are selected from the group consisting of oxides of alumina, zirconia, hafnia, magnesia, titanium, calcium, silica, yttria, and combinations thereof.

15. A method of cleaning a coated surface of an article, the method comprised of the steps of providing a coated article, the article comprised of a component of a gas turbine engine assembly, the article having a thermal barrier coating, the thermal barrier coating having a damaged coating area;

providing an apparatus having an applicator communicably connected to a liquid dispensing unit by a dispensing tube, the liquid dispensing unit comprised of a liquid reservoir containing a cleaning solution, the liquid reservoir communicably connected to the applicator by a dispensing tube;

cleaning the damaged area of the coating with the apparatus by moving the applicator across the damaged area;

dispensing a liquid from the apparatus by applying external pressure to the liquid reservoir;

distributing the liquid using the applicator;

providing a second apparatus comprised of a liquid dispensing unit comprised of a liquid reservoir containing a liquid, the liquid reservoir communicably connected to one end of a dispensing tube, and a dispensing tip communicably connected to the opposite end of the dispensing tube, the apparatus further comprised of at least one applicator attached to, but not communicably connected with, the fluid dispensing unit; and dispensing a liquid from the dispensing tip of the second apparatus by applying external pressure to the liquid reservoir; and distributing the liquid using the applicator of the second apparatus.

16. The method of claim 15, wherein the liquid contained in the liquid reservoir of the second apparatus is selected from the group consisting of primers and coating repair compositions.

17. The method of claim 16, wherein the coating repair composition is a liquid mixture comprising one or more refractory materials in powdered form, one or more binders, and a solvent.

18. The method of claim 17, wherein the refractory materials are selected from the group consisting of oxides of alumina, zirconia, hafnia, magnesia, titanium, calcium, silica, yttria, and combinations thereof.

19. The method of claim 18, further comprised of the steps of providing a third apparatus comprised of a liquid dispensing unit comprised of a liquid reservoir containing a liquid, the liquid reservoir communicably connected to one end of a dispensing tube, and a dispensing tip communicably connected to the opposite end of the dispensing tube, the apparatus further comprised of at least one applicator attached to, but not communicably connected with, the fluid dispensing unit; and dispensing a liquid from the dispensing tip of the third apparatus by applying external pressure to the liquid reservoir; and distributing the liquid using the applicator of the third apparatus.

20. The method of claim 19, wherein the liquid contained in the liquid reservoir of the second apparatus is a primer, and wherein the liquid contained in the reservoir of the third apparatus is a coating repair composition comprised of a liquid mixture comprising one or more refractory materials, one or more binders, and a solvent.

* * * * *